(12) United States Patent
Takagi et al.

(10) Patent No.: US 6,721,133 B2
(45) Date of Patent: Apr. 13, 2004

(54) SUSPENSION WITH SEPARATE HINGE MEMBER FOR DISC DRIVE

(75) Inventors: Yasuji Takagi, Ebina (JP); Masao Hanya, Yokohama (JP); Osamu Iriuchijima, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 3 days.

(21) Appl. No.: 09/813,584

(22) Filed: Mar. 21, 2001

(65) Prior Publication Data

US 2002/0048121 A1 Apr. 25, 2002

(30) Foreign Application Priority Data

Oct. 25, 2000 (JP) ........................................ 2000-325741

(51) Int. Cl.⁷ .............................. G11B 21/16; G11B 5/48
(52) U.S. Cl. .................................. 360/244.8; 360/244.9
(58) Field of Search ........................... 360/245.2, 244.9, 360/244.8, 244.5, 244.2, 244, 264, 240, 244.3

(56) References Cited

U.S. PATENT DOCUMENTS

| | | | | |
|---|---|---|---|---|
| 4,991,045 A | | 2/1991 | Oberg ....................... 360/244.3 |
| 6,018,871 A | * | 2/2000 | Khan et al. ................... 29/896.9 |
| 6,046,885 A | * | 4/2000 | Aimonetti et al. .......... 360/244.6 |
| 6,381,099 B1 | * | 4/2002 | Mei .......................... 360/244.3 |
| 6,388,842 B1 | * | 5/2002 | Murphy ..................... 360/244.8 |
| 6,597,538 B1 | * | 7/2003 | Kashima et al. ............ 360/244.5 |
| 2001/0008475 A1 | * | 7/2001 | Takagi et al. .............. 360/244.8 |
| 2001/0012181 A1 | * | 8/2001 | Inoue et al. ............... 360/244.2 |
| 2001/0043443 A1 | * | 11/2001 | Okamoto et al. ............ 360/294 |
| 2001/0048574 A1 | * | 12/2001 | Bhattacharya et al. ..... 360/244.2 |
| 2002/0051322 A1 | * | 5/2002 | Kashima et al. ............ 360/245.2 |

FOREIGN PATENT DOCUMENTS

JP 60-127578 7/1985

OTHER PUBLICATIONS

M. Hanya et al, "Suspension Design for Windage and High Bandwidth", (Treatise), Presented on Mar. 27, 2000, Japan.

* cited by examiner

Primary Examiner—Julie Anne Watko
(74) Attorney, Agent, or Firm—Frishauf, Holtz, Goodman & Chick, P.C.

(57) ABSTRACT

A suspension for disc drive comprises a base portion, a beam portion formed of the same material as the base portion and made thinner than the base portion by partial etching, and a hinge member connecting the base portion and the beam portion to each other. In manufacturing this suspension, a platelike semi-finished suspension, which integrally includes a base portion, a beam portion, and a connecting portion connecting the base portion and the beam portion to each other, is first manufactured. The thickness of the beam portion of the semi-finished suspension is reduced by partial etching. Thereafter, the base portion and the beam portion are connected by means of the hinge member, and moreover, the connecting portion is separated from the base portion and the beam portion.

2 Claims, 3 Drawing Sheets

SUSPENSION WITH SEPARATE HINGE MEMBER FOR DISC DRIVE

CROSS REFERENCE TO RELATED APPLICATIONS

This application is based upon and claims the benefit of priority from the prior Japanese patent Application No. 2000-325741, filed Oct. 25, 2000 the entire contents of which are incorporated herein by reference.

BACKGROUND OF THE INVENTION

The present invention relates to a suspension for disc drive incorporated in an information processing apparatus, such as a personal computer, and a manufacturing method therefor.

A hard disc drive (HDD) for recording in and reading information from a rotating magnetic disc or magneto-optical disc includes a carriage that can turn around a shaft. The carriage is rotated around the shaft by means of a positioning motor. The carriage is provided with an arm (actuator arm), a suspension mounted on the distal end portion of the arm, a head portion including a slider mounted on the suspension, etc. When the disc rotates at high speed, the slider slightly lifts off the disc surface, whereupon an air bearing is formed between the disc and the slider. The suspension comprises a base portion including a base plate, a beam portion formed of a precision plate spring, a flexure fixed to the beam portion by laser welding or the like, etc. The base plate is fixed to a suspension mounting surface of the arm.

With the advance of compaction of information recorded in the disc and speed-up of the disc drive operation, the disc drive of this type has been required a shorter seek time. In order to shorten the seek time, the operation of movable portions (e.g., suspension) of the disc drive must be speeded up by reducing the weight of the movable portions and increasing the resonance frequency.

Improvement of the resonance frequency of the suspension requires a certain thickness of the base portion. If that part of the suspension of this type which covers the overall length, ranging from the base portion to the beam portion, is formed integrally from one material plate, the base portion and the beam portion have the same thickness. If a thick material is used to secure the thickness of the base portion, therefore, the beam portion is so thick that the whole suspension inevitably becomes heavy. If a thin material is used, on the other hand, the stiffness of the suspension is lowered, so that the resonance mode worsens. In these cases, the aforesaid reduction in weight and increase of the resonance frequency cannot be achieved, so that it is hard to realize high-speed seek.

Accordingly, the inventor hereof has proposed a novel suspension in which a base portion and a beam portion are connected by means of a hinge member. According to this prior art, the base portion, beam portion, and hinge member are separate components, so that materials and plate thicknesses corresponding to their respective required properties can be selected individually. Since the base portion and the beam portion are independent of each other, however, it is hard relatively to position them with high accuracy. Thus, there is still room for improvement in positioning accuracy (alignment).

BRIEF SUMMARY OF THE INVENTION

Accordingly, the object of the present invention is to provide a suspension reduced in weight and capable of high-accuracy positioning between a base portion and a beam portion.

In order to achieve the above object, a suspension according to the present invention comprises a base portion, a beam portion formed of the same material as the base portion and made thinner than the base portion by partial etching, and a hinge member connecting the base portion and the beam portion to each other. The hinge member is lower in bending stiffness than the base portion and the beam portion. When a bending load is applied to the beam portion, therefore, the hinge member bends, thereby displaying a given spring characteristic.

According to this invention, the base portion and the beam portion can be made thick and thin, respectively, so that the resonance characteristic and the like can be improved, and the bandwidth of a servo mechanism can be adjusted to a higher level. Since the base portion and the beam portion can be formed from one semi-finished suspension, moreover, their relative positions can be regulated accurately.

A manufacturing method for a suspension according to the invention comprises a process for manufacturing a platelike semi-finished suspension integrally including a base portion, a beam portion, and a connecting portion connecting the base portion and the beam portion to each other, an etching process for making the beam portion thinner than the base portion by partial etching, a hinge mounting process for connecting the base portion and the beam portion by means of a hinge member, and a cutting process for separating the connecting portion from the base portion and the beam portion after the hinge mounting process.

According to this invention, the base portion and the beam portion are connected by means of the hinge member in a manner such that they are integrally included in the semi-finished suspension, so that they can be positioned accurately, and their alignment is improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
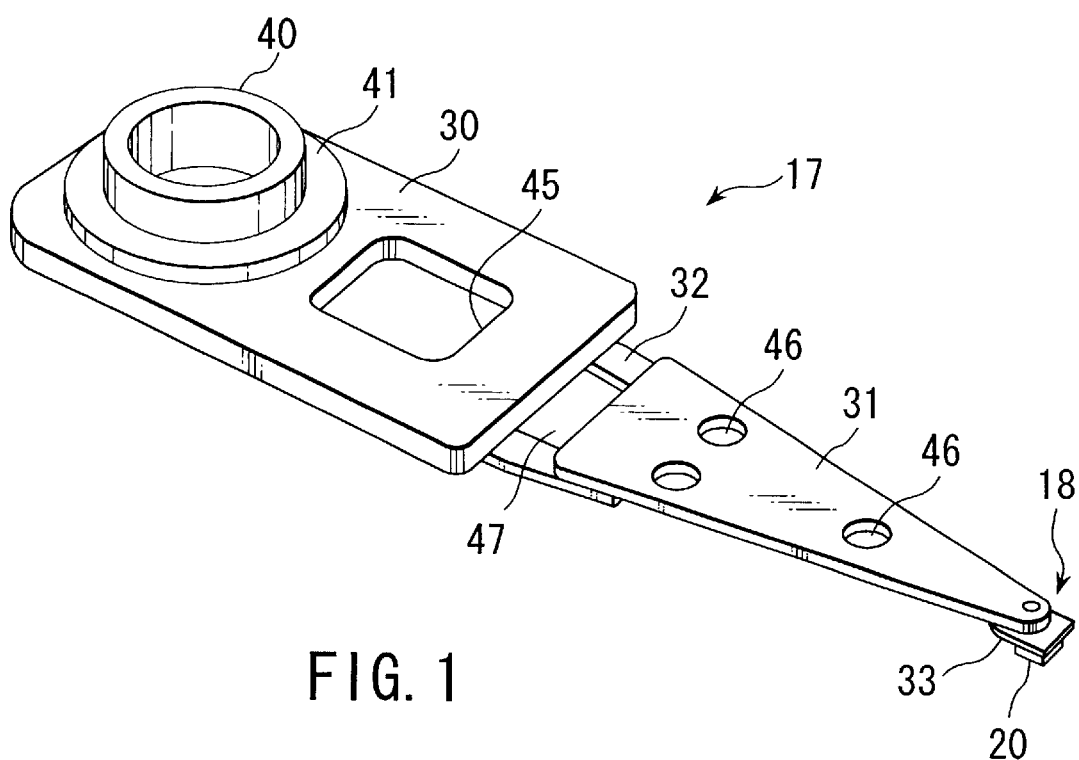
FIG. 1 is a perspective view of a suspension for disc drive according to a first embodiment of the present invention.

A first embodiment of the present invention will now be described with reference to FIGS. 1 to 6. A hard disc drive (HDD) 10 shown in FIG. 2 includes a carriage 12 that can turn around a shaft 11. The carriage 12 is rotated around the shaft 11 by means of a positioning motor 13 such as a voice coil motor. The carriage 12 is provided with arms (actuator arms) 16, suspensions 17 mounted individually on the respective distal end portions of the arms 16, head portions 18 on the respective distal end portions of the suspensions 17, etc. As the carriage 12 is driven by means of the motor 13, the head portion 18 moves to a desired track of a disc 19.

The head portion 18 includes a slider 20 situated in a position such that it can face a recording surface of the disc 19, a transducer (not shown) held on the slider 20, etc. When the disc 19 rotates at high speed, air that gets into the space between the disc 19 and the slider 20 slightly lifts the slider 20 off the disc 19 and forms an air bearing between the disc 19 and the slider 20.

Figure 2:
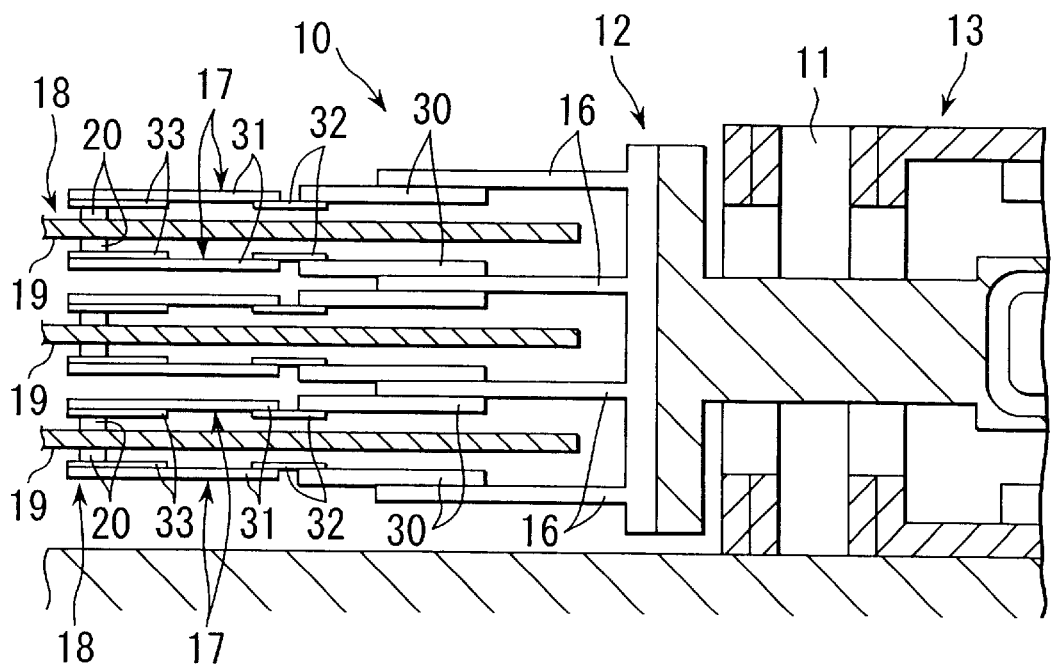
FIG. 2 is a sectional view of a part of a hard disc drive with the suspension shown in FIG. 1.
Figure 3:
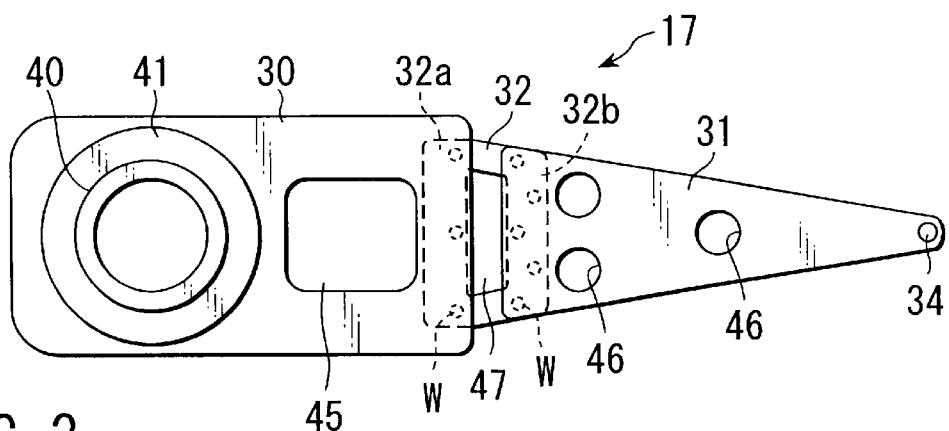
FIG. 3 is a plan view of the suspension shown in FIG. 1.
Figure 4:
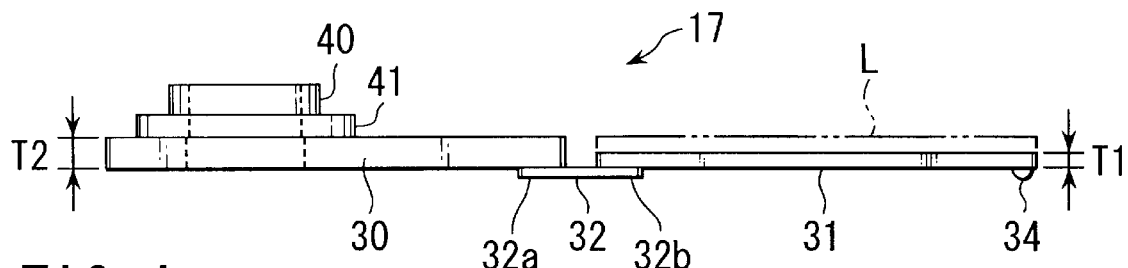
FIG. 4 is a side view of the suspension shown in FIG. 1.

As shown in FIGS. 1, 3 and 4, each suspension 17 comprises a base portion 30, a beam portion 31, a hinge member 32 connecting the base portion 30 and the beam portion 31, a flexure 33 on the beam portion 31, etc. The distal end portion of the beam portion 31 is formed having a convex dimple 34 that abuts the flexure 33. The head portion 18 is attached to the flexure 33. A base plate 41 having a boss portion 40 is fixed to the base portion 30. As shown in FIG. 2, each base portion 30 is fixed to its corresponding actuator arm 16.

The base portion 30 and the beam portion 31 are formed of the same material (e.g., stainless steel). In order to reconcile lighter weight with higher stiffness, they may be formed of a light alloy, such as aluminum or titanium alloy, or a composite material based on these alloys, which ensures further improved frequency characteristics and vibration characteristics. Apertures 45 and 46 are formed penetrating the base portion 30 and the beam portion 31, respectively, in the thickness direction thereof. Instead of forming the apertures 45 and 46, the respective wall thicknesses of the base portion 30 and the beam portion 31 may be partially reduced by etching or the like.

The hinge member 32 is a plate spring member, e.g., a rolled stainless-steel plate, which is thinner than the base portion 30 and the beam portion 31. An aperture 47 is formed in the central portion of the hinge member 32 with respect to its width direction. As shown in FIG. 3, one end portion 32a of the hinge member 32 is fixed to an end portion of the base portion 30 by laser welding or the like. The other end portion 32b of the hinge member 32 is fixed to an end portion of the beam portion 31 by laser welding or the like. The laser welding may be replaced with an adhesive agent or any other suitable fixing means.

The flexure 33 that is fixed to the beam portion 31 is formed of a plate spring (e.g., rolled stainless steel) that is thinner than the beam portion 31, and is fixed in a given position on the beam portion 31 by laser welding or the like. The flexure 33 is fitted with the slider 20 that constitutes the head portion 18.

The hinge member 32 of this embodiment is composed of a component separated from the base portion 30 and the beam portion 31. Therefore, a spring material and a thickness that meet required properties of the hinge member 32 can be adopted without regard to the base portion 30 and the beam portion 31. Thus, properties (e.g., high stiffness) that are required of the base portion 30 and the beam portion 31 can be easily reconciled with the properties (e.g., low spring constant) that are required of the hinge member 32.

In the suspension 17 of this embodiment, a thickness T1 (shown in FIG. 4) of the beam portion 31 is made smaller than a thickness T2 of the base portion 30 by partial etching. For example, the thicknesses T1 and T2 of the beam portion 31 and the base portion 30 are about 100 μm and 200 μm, respectively, and the thickness of the hinge member 32 is 40 μm or thereabout. A two-dot chain line L in FIG. 4 represents the thickness of the unetched beam portion 31. Since these components can be accurately shaped by etching without requiring pressing, their flatness is improved.

The following is a description of a manufacturing method for the suspension 17.

Figure 5:
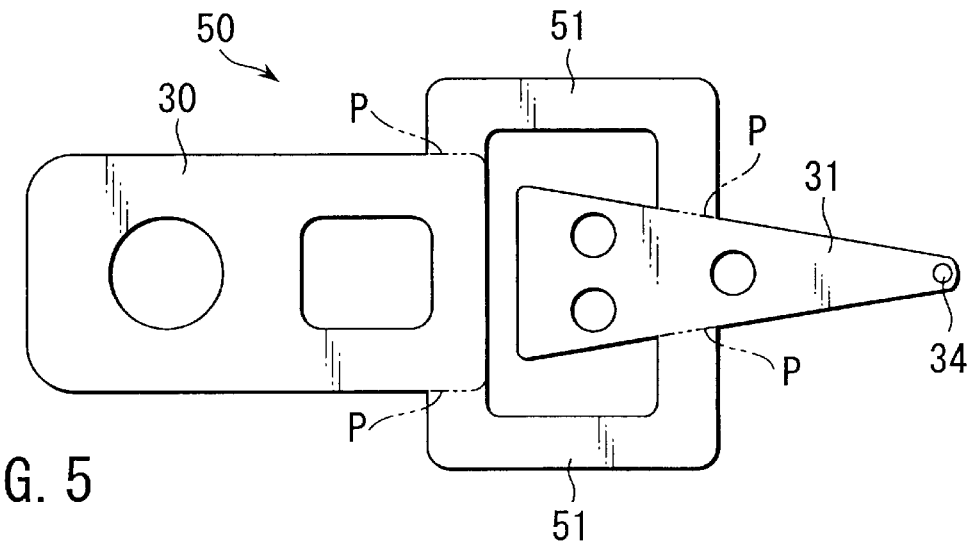
FIG. 5 is a plan view of a semi-finished suspension used in manufacturing the suspension shown in FIG. 1.

First, in a first forming process, a platelike semi-finished suspension 50 shown in FIG. 5 is manufactured using one material plate. The semi-finished suspension 50 integrally includes the base portion 30, the beam portion 31, and a pair of connecting portions 51 that connect the respective opposite side portions of the base portion 30 and the beam portion 31.

Figure 6:
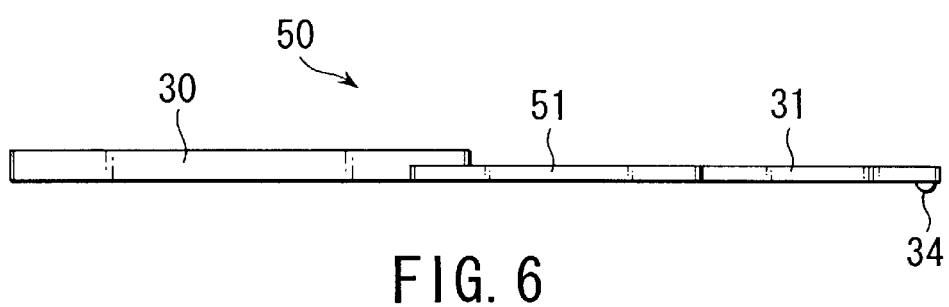
FIG. 6 is a side view of the semi-finished suspension shown in FIG. 5.

Then, in an etching process, the thickness of at least the beam portion 31 of the semi-finished suspension 50 is made smaller than that of the base portion 30 by partial etching, as shown in FIG. 6. The thickness of the etched beam portion 31 is subject to some variation. However, a study made by the inventor hereof indicates that the variation of the thickness of the beam portion 31 practically exerts no bad influence upon the resonance characteristic of the suspension 17.

In a hinge mounting process that follows the etching processes, the base portion 30 and the beam portion 31 are connected to each other by means of hinge member 32. The hinge member 32 is fixed to the base portion 30 and the beam portion 31 by laser welding, for example. In FIG. 3, symbol w designates an example of a weld.

In a cutting process that follows the hinge mounting process, the connecting portions 51 of the semi-finished suspension 50 are cut in positions indicated by two-dot chain lines P in FIG. 5, for example, whereby they are separated from the base portion 30 and the beam portion 31. Thus, the suspension 17 shown in FIG. 3 can be obtained.

Figure 7:
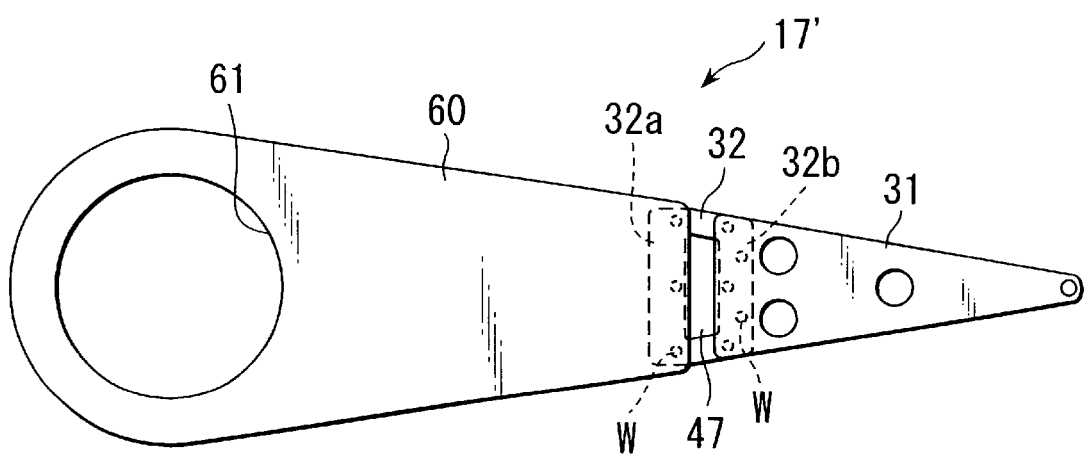
FIG. 7 is a plan view of a suspension according to a second embodiment of the invention.
Figure 8:
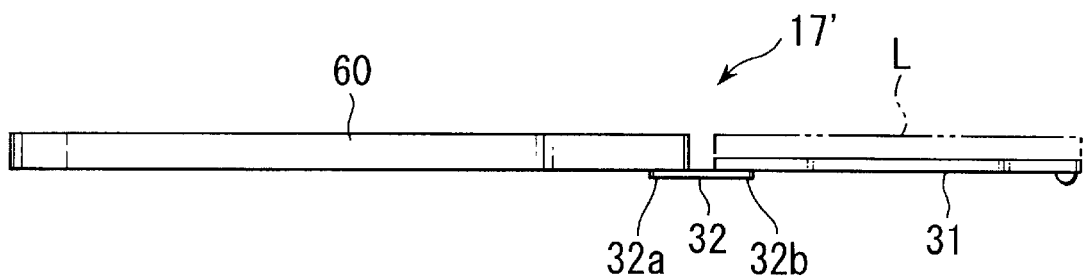
FIG. 8 is a side view of the suspension shown in FIG. 7.
Figure 9:
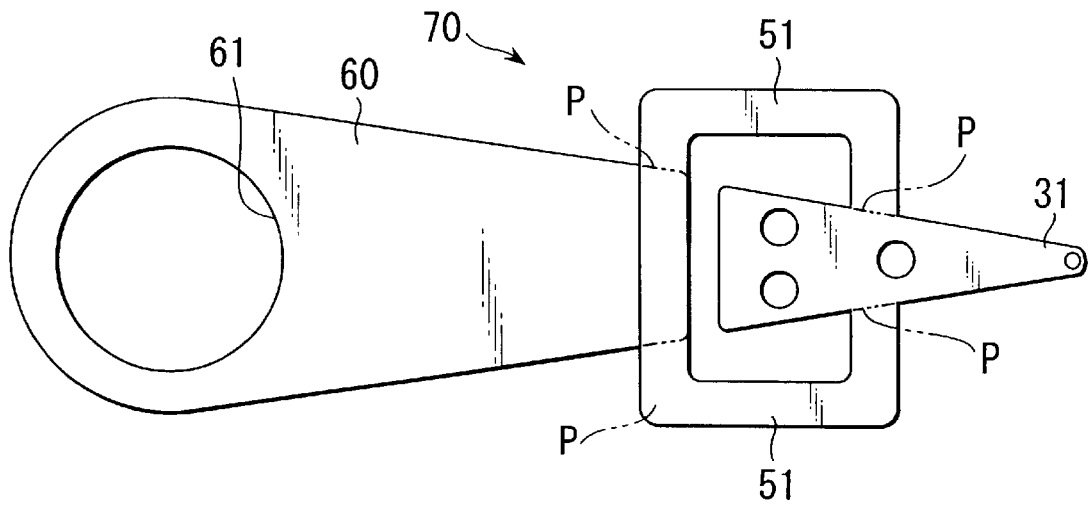
FIG. 9 is a plan view of a semi-finished suspension used in manufacturing the suspension shown in FIG. 7.

FIGS. 7 and 8 show a suspension 17' according to a second embodiment of the present invention. FIG. 9 shows a semi-finished suspension 70 used in the manufacture of the suspension 17'. The semi-finished suspension 70 of this embodiment includes a base portion 60 of the so-called long-mount type. A rotating shaft of a positioning motor, such as a voice coil motor, is inserted in a hole 61 in the base portion 60. The suspension 17' of the second embodiment has other configurations, functions, and effects in common with the suspension 17 of the first embodiment. Therefore, like reference numerals are used to designate common portions of the two embodiments, and a description of those portions is omitted.

It is to be understood, in carrying out the present invention, that the components of the suspension, including the hinge member, semi-finished suspension, and connecting portions, as well the base portion and the beam portion, may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for disc drive, comprising:

a base portion having a thickness;

a beam portion having a thickness, the beam portion being formed of the same material as the base portion, the thickness of the beam portion being thinner than the thickness of the base portion by partial etching;

a hinge member connecting the base portion and the beam portion to each other; and a flexure formed as a separate body from the hinge member and the beam portion, the flexure being fixed to the beam portion.

2. A suspension for disc drive, comprising:

a base portion having a thickness;

a beam portion having a thickness, the beam portion being formed of the same material as the base portion, the thickness of the beam portion being thinner than the thickness of the base portion by partial etching;

a base plate having a thickness and which is overlaid on the base portion and fixed thereon, the thickness of the base plate being thicker than the thickness of the beam portion, and a hinge member having a thickness, and which connects the base portion and the beam portion to each other, the thickness of the hinge member being thinner and having a lower bending stiffness than that of the base portion, which is thinner and has a lower bending stiffness than that of the beam portion, which is formed as a separate member from the base portion and the beam portion, and which is fixed to the base portion and the beam portion.

* * * * *